(12) United States Patent
Seo et al.

(10) Patent No.: US 9,641,361 B2
(45) Date of Patent: May 2, 2017

(54) SUB-SAMPLING RECEIVER

(71) Applicant: Electronics and Telecommunications Research Institute, Daejeon (KR)

(72) Inventors: Seok Seo, Daejeon (KR); Jinup Kim, Daejeon (KR); Seung-Hwan Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/542,846

(22) Filed: Nov. 17, 2014

(65) Prior Publication Data

US 2015/0139372 A1 May 21, 2015

(30) Foreign Application Priority Data

Nov. 19, 2013 (KR) .................. 10-2013-0140987
Oct. 20, 2014 (KR) .................. 10-2014-0141534

(51) Int. Cl.
| | |
|---|---|
| *H03K 9/00* | (2006.01) |
| *H04L 27/00* | (2006.01) |
| *H03D 1/04* | (2006.01) |
| *H04L 25/08* | (2006.01) |
| *H04L 25/05* | (2006.01) |
| *H04B 1/00* | (2006.01) |

(52) U.S. Cl.
CPC .......... *H04L 25/08* (2013.01); *H04B 1/0021* (2013.01); *H04L 25/05* (2013.01)

(58) Field of Classification Search
USPC ............... 375/211, 147, 146, 219, 220, 222, 375/240.27, 240.26, 259, 278, 285, 284, 375/295, 296, 316, 324, 344, 345, 346, 375/348, 354, 358, 356, 340
See application file for complete search history.

(56) References Cited

U.S. PATENT DOCUMENTS

| | | | | |
|---|---|---|---|---|
| 8,509,722 | B2 * | 8/2013 | Popoli ...................... | H03J 7/04 375/354 |
| 8,786,472 | B1 * | 7/2014 | Prince ..................... | H03M 7/00 341/123 |
| 2007/0140382 | A1 | 6/2007 | Qian | |
| 2009/0016471 | A1 * | 1/2009 | Rajagopal .............. | H03G 3/345 375/346 |
| 2009/0058475 | A1 * | 3/2009 | Jung ...................... | H03D 7/161 327/113 |

(Continued)

FOREIGN PATENT DOCUMENTS

KR      10-0735326 B1      7/2007

*Primary Examiner* — Linda Wong
(74) *Attorney, Agent, or Firm* — NSIP Law

(57) ABSTRACT

Provided is a wireless signal receiver including: an analog-digital converter (ADC) converting an analog RF signal into a digital baseband signal; and a sub-sampling block dividing and processing the digital baseband signal into a first path signal and a second path signal, and extracting a complex baseband signal by using a relative sample delay difference between the first and second path signals, wherein the first path signal is a signal obtained by adjusting a sample delay and sampling rate of the digital baseband signal, and the second path signal is a signal obtained by filtering without adjusting the sampling rate of the digital baseband signal.

20 Claims, 12 Drawing Sheets

(56) References Cited

U.S. PATENT DOCUMENTS

| | | | |
|---|---|---|---|
| 2009/0219982 A1* | 9/2009 | Yang | H04L 25/03019 375/231 |
| 2011/0227665 A1* | 9/2011 | Wyville | H03H 11/344 333/17.1 |
| 2012/0269234 A1* | 10/2012 | Zhang | H04L 5/0007 375/143 |
| 2012/0300878 A1* | 11/2012 | Cai | H03F 1/3294 375/296 |
| 2013/0177107 A1* | 7/2013 | Seo | H04B 1/001 375/340 |
| 2013/0258996 A1 | 10/2013 | Jung et al. | |
| 2014/0016574 A1 | 1/2014 | Seo et al. | |
| 2014/0043177 A1* | 2/2014 | Pagnanelli | 341/143 |

* cited by examiner

US 9,641,361 B2

SUB-SAMPLING RECEIVER

CROSS-REFERENCE TO RELATED APPLICATIONS

This U.S. non-provisional patent application claims priority under 35 U.S.C. §119 of Korean Patent Application Nos. 10-2013-0140987, filed on Nov. 19, 2013, and 10-2014-0141534, filed on Oct. 20, 2014, the entire contents of which are hereby incorporated by reference.

BACKGROUND OF THE INVENTION

The present invention disclosed herein relates to a communication system, and more particularly, to a sub-sampling receiver.

With the miniaturization trend of a wireless communication system, needs for a next-generation wireless communication receiver having flexibility, adaptability and cognitivity are increasing. In order to satisfy these needs, there is a need for a technology to design a receiver of which the analog-to-digital converter (ADC) is as similar as possible to an antenna and which performs frequency conversion and demodulation functions by using a digital signal processor (DSP). As a next-generation wireless communication receiver satisfying such a condition, a sub-sampling receiver is taking center stage. The sub-sampling receiver may provide excellent functions in aspects of the re-configurability of a received signal and multi-band/multi-mode reception.

A general sub-sampling receiver may receive an analog RF signal through an antenna and extract an analog signal in a certain band through an analog band-pass filter. An extracted analog signal in the certain band may be amplified through a low noise amplifier (LNA), and then converted into a base-band signal in digital form through an analog-digital converter (ADC). Since the sub-sampling receiver does not use an analog element such as a mixer, local oscillator, etc., it is possible to provide a wireless communication receiver that is flexible, inexpensive and small. However, a typical sub-sampling receiver has a limitation in that it is possible to down-convert a received analog RF signal into the base-band signal in digital form only when a carrier frequency becomes a multiple of a sampling rate in receiving a single RF signal.

Thus, when there is a need to receive a signal located at any frequency band by using the typical sub-sampling receiver, the sampling rate should be determined so that aliasing does not occur in a baseband after digital conversion. However, determining the sampling rate at which aliasing does not occur is very complicated and furthermore, there are many cases where there is no solution for the sampling rate at which the aliasing does not occur. Thus, there is a limitation in receiving an RF signal located at any frequency band by using the typical sub-sampling receiver.

A second-order bandpass sampling receiver suggested in order to solve these problems samples by using two ADCs and then removes aliasing by using signal processing. Thus, the sampling rate may be selected without considering the aliasing. However, since a typical second-order band-pass sampling receiver uses two ADCs, it increases hardware complexity and has a serious performance degradation resulting from an analog time error between two signal paths and imbalance in an analog signal size.

SUMMARY OF THE INVENTION

The present invention provides a bandpass sampling receiver that may decrease hardware complexity and also apply a sampling rate flexibly.

The present invention also provides a bandpass sampling receiver that may receive with respect to all frequency bands and signal bandwidths.

The present invention also provides a bandpass sampling receiver that may effectively remove aliasing occurring in a baseband by using a single analog-digital converter.

The present invention also provides a bandpass sampling receiver that may prevent the relative delay time error between signal paths and imbalance in an analog signal size.

Embodiments of the present invention provide wireless signal receivers include an analog-digital converter (ADC) converting an analog RF signal into a digital baseband signal; and a sub-sampling block dividing and processing the digital baseband signal into a first path signal and a second path signal, and extracting a complex baseband signal by using a relative sample delay difference between the first and second path signals, wherein the first path signal is a signal obtained by adjusting a sample delay and sampling rate of the digital baseband signal, and the second path signal is a signal obtained by filtering without adjusting the sampling rate of the digital baseband signal.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

The above general descriptions and the following detailed descriptions all are exemplary for providing additional descriptions on the claimed invention. Therefore, the present invention is not limited embodiments to be described below but may be implemented in other forms. Exemplary embodiments introduced herein are provided to make disclosed contents thorough and complete and to sufficiently transfer the spirit of the present invention to a person skilled in the art.

The terms used herein are only used to describe specific embodiments and not intended to limit the present invention. The terms in singular form include the plural form unless otherwise specified. It should be understood that the terms "includes" or "has" indicate the presence of characteristics, numbers, steps, operations, components, parts or combinations thereof represented in the present disclosure but do not exclude the presence or addition of one or more other characteristics, numbers, steps, operations, components, parts or combinations thereof.

Unless otherwise defined herein, all terms used herein including technical or scientific terms have the same meanings as those generally understood by a person skilled in the art. Terms defined in generally used dictionaries should be construed to have meanings matching with contextual meanings in the related art and are not construed as an ideal or excessively formal meaning unless otherwise defined herein.

When the present disclosure mentions that any part includes any component, it means that it is also possible to further include other components. Also, each embodiment described and illustrated herein includes its complementary embodiment. Embodiments of the present invention are described below in detail with reference to the accompanying drawings.

Figure 1:
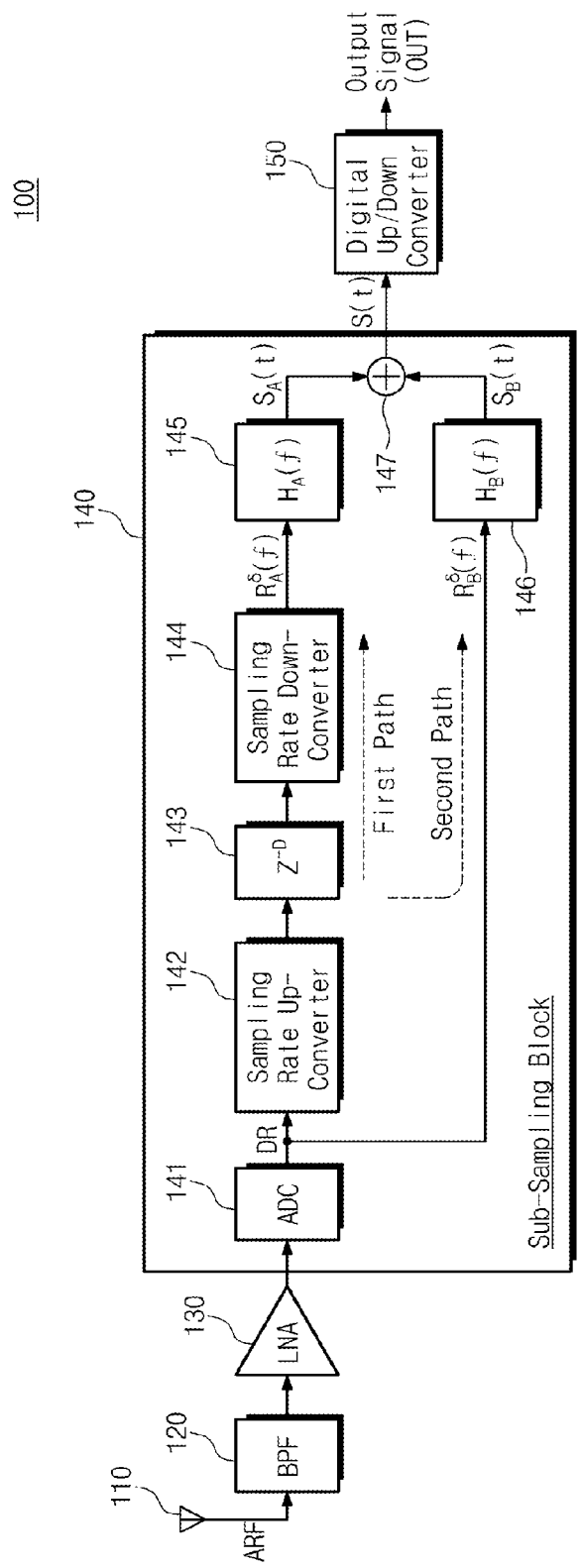
FIG. 1 is a block diagram of a receiver including a sub-sampling block according to a first embodiment of the present invention.

FIG. 1 is a block diagram of a receiver including a sub-sampling block according to a first embodiment of the present invention. Referring to FIG. 1, a receiver 100 of the present invention may include an antenna 110, a band filter 120, a low noise amplifier 130, and a sub-sampling block 140. The sub-sampling block 140 includes a first path that provides a sample delay and sampling rate adjustment for a baseband signal, and a second path to which the sample delay and sampling rate adjustment are not applied. Through such a configuration, the sub-sampling block 140 may effectively remove aliasing occurring in a baseband. As needed, a digital up/down-converter 150 may also be included in the receiver.

The antenna 110 performs a function that receives analog radio frequency ARF signals transmitted wirelessly. The bandpass filter 120 passes a signal in a specific frequency band among received RF signals. The band filter 120 may be designed so that a pass band is limited to a certain bandwidth B, and removes out-of-signal-band noise. In an exemplary embodiment, a pass band and pass bandwidth B that are set in the band filter 120 may be fixed values or adjusted to another values. To this end, the band filter 120 may include a tunable BPF. The low noise amplifier 130 amplifies a signal selected by the band filter 120 by a certain gain. A signal amplified by the low-noise amplifier 130 will be transmitted to the sub-sampling block 140 including an ADC 141.

The sub-sampling block 140 may include an analog-digital converter (ADC) 141, a sampling rate up-converter 142, a sample delay 143, a sampling rate down-converter 144, a first digital filter 145, a second digital filter 146, and an adder 147. In this example, the sub-sampling block 140 includes an ADC 141. In addition, a baseband signal sampled in the ADC 141 is provided to the sampling rate up-converter 142. A signal increased in a sampling rate by the sampling rate up-converter 142 is added at the adder 147 through a first path including the sample delay unit 143, the sampling rate down-converter 144, and the first digital filter 145, and a second path including only the second digital filter 146. Signal s(t) added at the adder 147 is processed by the digital up/down-converter 150 as needed and provided as an output signal OUT.

The ADC 141 converts an analog signal provided from the LNA 130 into a digital baseband signal DR. For example, the ADC 141 may sample the analog signal provided from the LNA 130 at a sampling rate $f_s$ and output it as the digital baseband signal DR. The spectrum of the digital baseband signal DR converted through the ADC 141 includes a positive spectrum component shifted from a positive frequency band and a negative spectrum component shifted from a negative frequency band.

The sampling rate up-converter 142 increases by N times the sampling rate of the digital baseband signal DR output from the ADC 141. The digital baseband signal DR output from the ADC 141 is divided into a first path signal processed along the first path and a second path signal processed along the second path. Since the digital baseband signal DR passes through the first path, its sampling rate increases by N times, a certain sample (e.g., 1 sample) is delayed, and then a sampling rate is down-converted by N times. In addition, the first path signal is lastly processed by the first digital filter 145 and then provided to the adder 147. On the contrary, the digital baseband signal DR is provided to the second digital filter 146 along the second path. The digital baseband signal DR passes through only the second digital filter 146 without a sample delay or a change in sampling rate when passing through the second path. In addition, the second path signal is processed by the second digital filter 146 and then provided to the adder 147.

In this example, the conversion times of the sampling rate up-converter 142 and the sampling rate down-converter 144 are the same. That is, the sampling rate of the first path signal passing through the sampling rate up-converter 142 and the sampling rate down-converter 144 is the same as that at an output of the ADC 141. In addition, the first path signal is delayed by the sample delay unit 143 located between the sampling rate up-converter 142 and the sampling rate down-converter 144. The sample delay unit 143 performs a D-sample delay on the first path signal. In this example, the delay size D of the sample delay unit 143 may be an integer that is larger than zero and smaller than a down sampling rate N.

A signal D-sample delayed through the sample delay unit 143 is down-sampled through the sampling rate down-converter 144 so that a sampling rate becomes 1/N times. The output signal of the sampling rate down-converter 144 is provided to the first digital filter 145. The digital baseband signal DR output from the ADC 141 is processed by the second digital filter 146 configuring the second path and provided to the adder 147.

In this example, the first digital filter 145 and the second digital filter 146 are designed based on the relative sample delay difference between the first and second paths or a fractional delay. The characteristics of the first digital filter 145 and the second digital filter 146 are described in more detail in FIGS. 3A and 3B below. It is possible to remove an image component shifted from a positive frequency band or an image component shifted from a negative frequency band through the first and second digital filters 145 and 146.

According to the configuration of the sub-sampling block 140 of the present invention, it is possible to remove aliasing from a baseband, which occurs by a positive frequency image component and a negative frequency image component. It is possible to remove an image component through the digital filters 145 and 146 in consideration of the delay size between two paths and the size of a down sample rate. That is, even though a single ADC 140 is used, it is possible to remove a complex baseband signal having a positive spectrum component shifted from a positive frequency band or a complex baseband signal having a negative spectrum component shifted from a negative frequency band. Thus, when compared to a typical bandpass sub-sampling receiver of which the sampling rate is limited to a specific sample rate, it is possible to select a sampling rate more flexibly and receive all frequency bands and signal bandwidths.

The central frequency of a complex baseband signal extracted from the sub-sampling block 140 may be determined by the carrier frequency $f_c$ and sampling rate $f_s$ of an analog RF signal and zero or not. If the central frequency of a complex baseband signal extracted from the sub-sampling block 140 is not zero, the central frequency of the complex baseband signal may be shifted to zero through a digital up/down-converter (not shown). If the central frequency of the complex baseband signal extracted from the sub-sampling block 140 is zero, the digital up/down-converter 150 that shifts the central frequency of the complex baseband signal to zero may not be included.

The complex baseband signal output from the sub-sampling block 140 may be a complex baseband signal having a positive spectrum component shifted from a positive frequency band or a complex baseband signal having a negative frequency spectrum component shifted from a negative frequency band. For the convenience of description, the present invention describes that the sub-sampling block 140 removes the negative frequency spectrum component shifted from the negative frequency band and outputs a complex baseband signal having the positive frequency spectrum component shifted from the positive frequency band. However, since it is an application of the present invention, the configuration of the complex baseband signal extracted from the sub-sampling block 140 is not limited to a specific form and various changes and modifications may be implemented.

Figure 2:
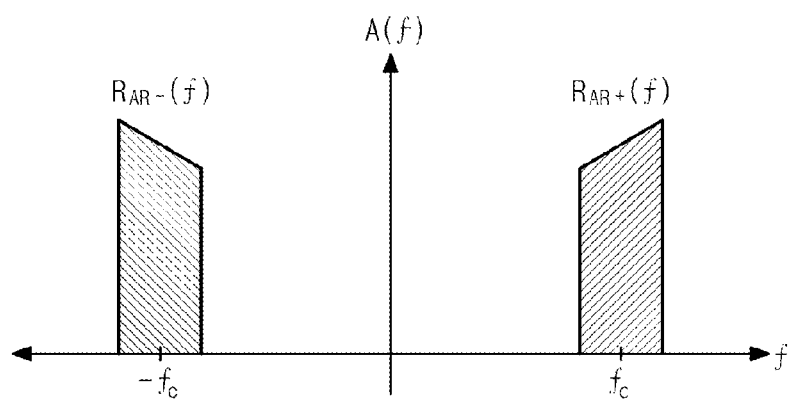
FIG. 2 illustrates the spectrums of analog radio frequency ARF signals located at any frequency bands.

FIG. 2 illustrates the spectrums of analog radio frequency ARF signals located at any frequency bands. Referring to FIG. 2, it may be assumed that the analog radio frequency ARF signal has a carrier frequency $f_c$ and a signal bandwidth B.

The spectrum A(f) in the frequency domain of the analog radio frequency ARF signal is expressed in the frequency domain by the symmetrical components of a positive frequency component and a negative frequency component. A spectrum component $RAR_+(f)$ represents the positive frequency spectrum component of the analog radio frequency ARF signal. A spectrum component $RAR_-(f)$ represents the negative frequency spectrum component of the analog radio frequency ARF signal.

Figure 3A:
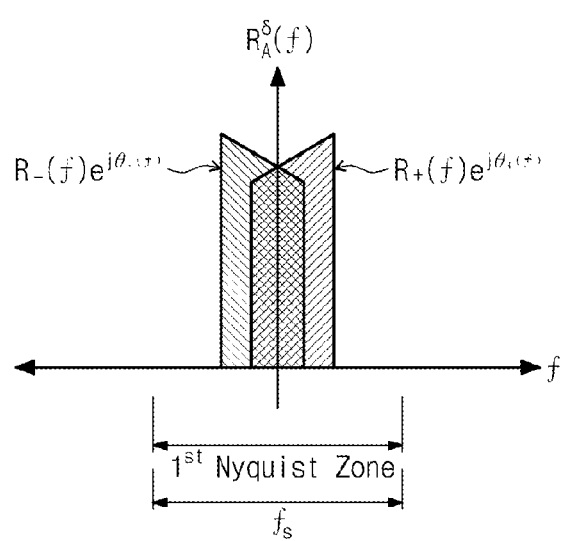
FIGS. 3A and 3B illustrate the frequency spectrums of first and second path signals of a sub-sampling block 140 of FIG. 1.
Figure 3B:
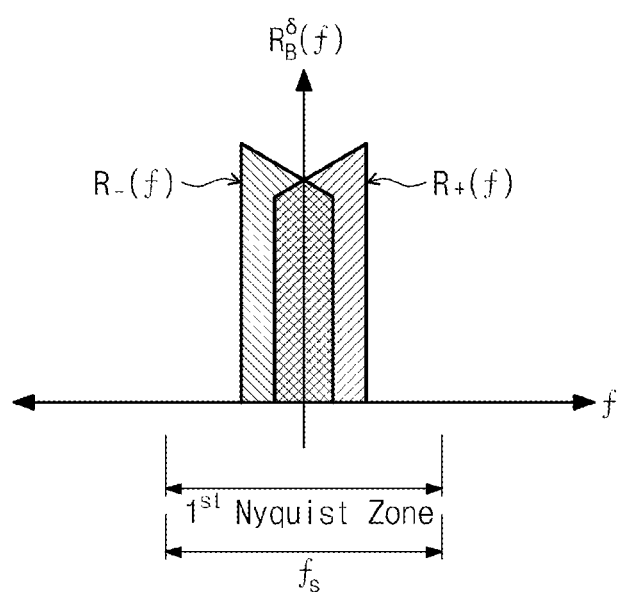

FIGS. 3A and 3B illustrate the spectrums of first and second path signals of the sub-sampling block 140 of FIG. 1. FIG. 3A shows the characteristic of a first path signal $R_A\delta(f)$ that is generated when the digital baseband signal DR output from the ADC 141 passes through the sampling rate up-converter 142, the sample delay unit 143, and the sampling rate down-converter 144. FIG. 3B shows the signal characteristic of a second path signal $R_B\delta(f)$ that the digital baseband signal DR output from the ADC 141 is transmitted without a delay or a change in sample rate.

The first path signal $R_A\delta(f)$ represents the spectrum of a signal that the digital base band signal DR is processed by the sampling rate up-converter 142, the sample delay unit 143, and the sampling rate down-converter 144. The first path signal $R_A\delta(f)$ may be understood to be a spectrum that a group delay effect due to a time delay difference is added to the second path signal $R_B\delta(f)$ corresponding to the spectrum of the digital baseband signal DR. That is, the first path signal $R_A\delta(f)$ is a signal to which a fractional delay of D/N is applied. As a result, the first path signal $R_A\delta(f)$ has the same effect as that the group delay is included in the second path signal $R_B\delta(f)$ by the time delay difference between paths.

The influence of the group delay due to the time delay of the first path signal $R_A\delta(f)$ may be given by with respect to a spectrum component shifted from a negative frequency band and with respect to a spectrum component shifted from a positive frequency band. In this example, n is a frequency band location index of a signal, may be provided as an integer value equal to or greater than zero, and is determined by the carrier frequency $f_c$ of a signal and the sampling rate $f_s$ of the ADC 141. That is, it may be represented that n=round $(f_c/f_s)$. In this example, the function round (x) means the rounding off of x.

When considering the relationship between the first path signal $R_A\delta(f)$ and the second path signal $R_B\delta(f)$ as described above, it is possible to remove a spectrum component shifted from a negative frequency band or a spectrum component shifted from a positive frequency band to obtain an intended complex baseband signal. In the following, a method of designing the first digital filter 145 and the second digital filter 146 is described in consideration of the relationship between the first path signal $R_A\delta(f)$ and the second path signal $R_B\delta(f)$.

The first path signal $R_A\delta(f)$ and the second path signal $R_B\delta(f)$ in a first Nyquist zone may be expressed by Equations 1 and 2, respectively.

$$R_A^\delta(f) = f_s\{R_-(f)e^{j2\pi nD/N}e^{-j2\pi Df(f_s)} + R_+(f)e^{-j2\pi nD/N}e^{-j\pi Df}(f^s)\} \quad \text{<Equation 1>}$$

$$R_A^\delta(f) = f_s\{R_-(f) + R_+(f)\} \quad \text{<Equation 2>}$$

In addition, a first spectrum $S_A\delta(f)$ representing a result obtained by filtering the first path signal $R_A\delta(f)$ by the first digital filter 145 and a second spectrum $S_B\delta(f)$ representing a result obtained by filtering the second path signal $R_A\delta(f)$ by the second digital filter 146 may be expressed by Equations 3 and 4, respectively.

$$S_A^\delta(f) = H_A(f)f_s\{R_-(f)e^{j2\pi nD/N}e^{-j2\pi Df/f_s} + R_+(f)e^{-j2\pi nD/N}e^{-j2\pi Df/f_s}\} \quad \text{<Equation 3>}$$

$$S_B^\delta(f) = H_B(f)f_s\{R_-(f) + R_+(f)\} \quad \text{<Equation 4>}$$

In this example, $R_-(f)$ and $R_+(f)$ correspond to baseband replica spectrums that the negative and positive frequency spectrum components of the digital baseband signal DR are frequency-shifted.

In addition, when respective outputs of the first digital filter 145 and the second digital filter 146 are added by the adder 147, the spectrum of the output signal s(t) from the adder 147 may be expressed by Equation 5 below.

$$S(f) = R_-(f)f_s\{H_A(f)e^{j2\pi nD/N}e^{-j2\pi Df/f_s} + H_B(f)\} + R_+(f)f_s\{H_A(f)e^{-j2\pi nD/N}e^{-j2\pi Df/f_s} + H_B(f)\} \quad \text{<Equation 5>}$$

A result of filtering the first path signal $R_A\delta(f)$ passing through the first digital filter 145 and a result of filtering the second path signal $R_B\delta(f)$ passing through the second digital filter 146 may be added through the adder 147. In another embodiment, it is well understood that the adder 147 may be replaced with a subtractor.

When there is a need to remove a spectrum component shifted from a negative frequency band and remain only a spectrum component shifting to a positive frequency band, Equation 6 below should be satisfied.

$$S(f) = R_-(f)f_s\{H_A(f)e^{j2\pi nD/N}e^{-j2\pi Df/f_s} + H_B(f)\} + \\ R_+(f)f_s\{H_A(f)e^{-j2\pi nD/N}e^{-j2\pi Df/f_s} + H_B(f)\} \\ = R_+(f)$$  <Equation 6>

In order to satisfy Equation 6, simultaneous equations given by Equations 7 and 8 below should be satisfied.

$$f_s\{H_A(f)e^{j2\pi nD/N}e^{-j2\pi Df/f_s} + H_B(f)\} = 0$$  <Equation 7>

$$f_s\{H_A(f)e^{j2\pi nD/N}e^{-j2\pi Df/f_s} + H_B(f)\} = 1$$  <Equation 8>

When the simultaneous equations satisfying Equations 7 and 8 are solved, respective response functions of the digital filters are obtained as follows:

$$H_A(f) = \frac{e^{j2\pi Df/f_s}}{f_s(e^{-j2\pi nD/N} - e^{j2\pi nD/N})}, |f| < \frac{f_s}{2}$$  <Equation 9>

$$H_B(f) = \frac{1}{f_s(1 - e^{-j4\pi nD/N})}, |f| < \frac{f_s}{2}$$  <Equation 10>

$H_A(f)$ and $H_B(f)$ obtained in this manner may be easily implemented through a digital FIR filter. In addition, $H_B(f)$ is a constant and not the function of a frequency, as could be seen in Equation 10. Thus, it may be seen that the filter characteristic $H_B(f)$ of the second digital filter 146 may be easily implemented by only complex multiplication.

Also, as could be seen in Equations 9 and 10, the sampling rate $f_s$ of the ADC 141, the sample delay value D of the sample delay unit 143, and the up or down conversion rate N of a sampling rate should satisfy $2nD/N \neq m$ (where m is an integer). In addition, in order to satisfy $2nD/N \neq m$ (where m is an integer), the sampling rate $f_s$, sample delay value D and up and down sampling rate N may be adjusted. In this example, n represents the location index of a wireless frequency band and m represents any integer.

Figure 4A:
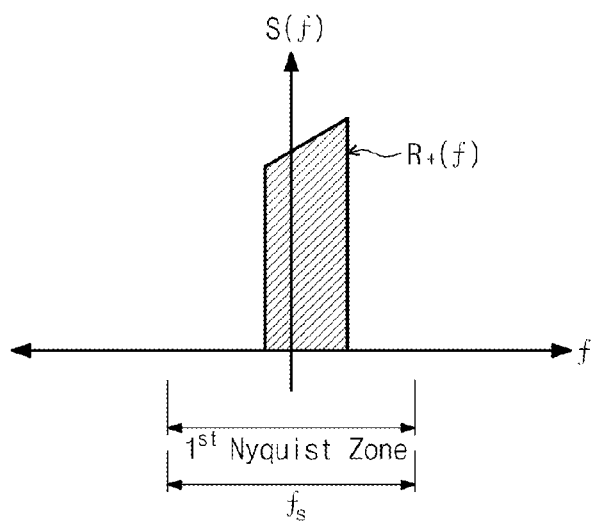
FIG. 4A illustrates the frequency spectrum of a complex baseband signal s(t) output from an adder in FIG. 1.
Figure 4B:
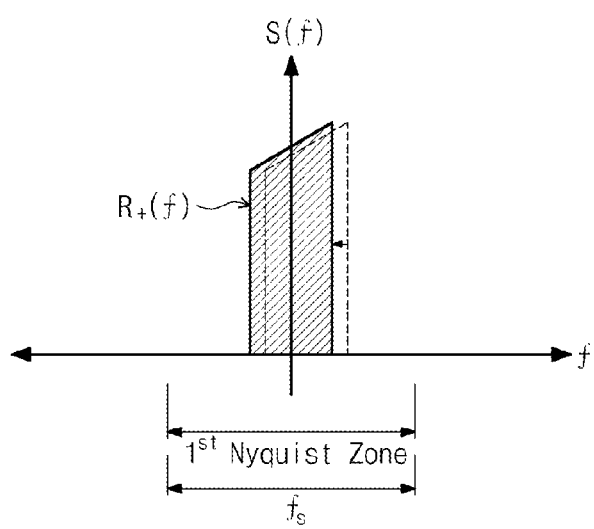
FIG. 4B illustrates the spectrum of a signal s'(t) output from the digital up/down-converter of FIG. 1.

FIG. 4A illustrates the frequency spectrum of the complex baseband signal s(t) output from the adder 147 in FIG. 1. FIG. 4B illustrates the spectrum of a signal s'(t) output from the digital up/down-converter 150 of FIG. 1.

Referring to FIG. 4A, it is possible to generate a signal s(t) without aliasing by a sum of $S_A(t)$ output from the first digital filter 145 and $S_B(t)$ output from the second digital filter 416. That is, since signals processed by the digital filters 145 and 146 described in Equations 9 and 10 are added by the adder 147, the spectrum component $R_-(f)$ shifted from a negative frequency band and only the spectrum component $R_+(f)$ shifted from a positive frequency band remains. Thus, it is possible to remove aliasing and generate a desired complex baseband signal.

When the spectrum of the baseband signal s(t) output through the adder 147 is observed, the central frequency of the baseband signal may not have a value of zero. For example, the central frequency of the baseband signal s(t) may be lower or higher than zero. In this case, the central frequency of the baseband signal s(t) may be up/down converted by the digital up/down-converter 150 and thus adjusted to zero.

Referring to FIG. 4B, a digital up/down conversion operation performed by the digital up/down-converter 150 is shown in a frequency domain. According to the digital up/down conversion operation of the digital up/down-converter 150, the central frequency of the signal s(t) output through the adder 147 may be adjusted to zero. The baseband signal s(t) is output as a baseband signal s'(t) of which the central frequency has been adjusted to zero by the frequency adjustment of the digital up/down-converter 150.

If the central frequency of the baseband signal s(t) output through the adder 147 is zero (i.e., if the central frequency of an analog RF signal is a multiple of a sampling rate), the digital up/down-converter 150 may not be included in a bandpass sampling receiver according to the present invention.

The function of a receiver that may remove aliasing through the sub-sampling block of the present invention as described above has been described. However, the characteristic of the digital filters is not limited to only Equations above and it is well understand that it is possible to implement the function of the receiver of the present invention with modified filter characteristics of various types.

Figure 5:
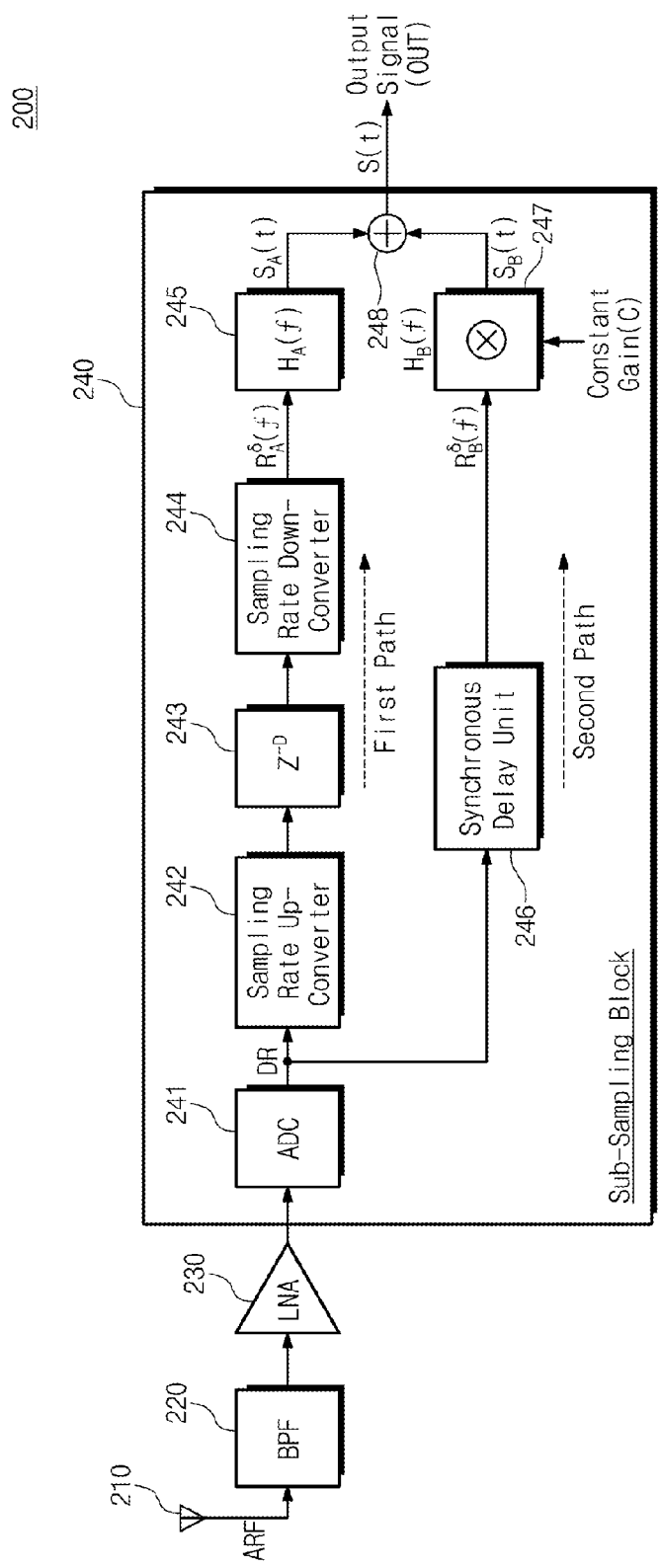
FIG. 5 shows an example in which a second digital filter 146 in the sub-sampling block 140 of FIG. 1 is replaced with the complex multiplication with a certain constant gain.

FIG. 5 shows an example in which the second digital filter 146 in the sub-sampling block 140 of FIG. 1 is replaced with the complex multiplication of a synchronous delay unit 246 with a certain constant gain C. Referring to FIG. 5, a receiver 200 may include an antenna 210, a band filter 220, an LNA 230, a sub-sampling block 240, and a digital up/down-converter 250. In this example, the configurations and functions of the antenna 210, the band filter 220, the LAN 230 and the digital up/down-converter 250 are substantially the same as those in FIG. 1.

The sub-sampling block 240 may include an ADC 241, a sampling rate up-converter 242, a sample delay 243, a sampling rate down-converter 244, a first digital filter 245, a synchronous delay unit 246, a complex multiplier 246, and an adder 247. In this example, a baseband signal sampled in the ADC 241 passes through the sampling rate up-converter 242, the sample delay unit 243, the sampling rate down-converter 244, and the first digital filter 245 to form a first path. In addition, a baseband signal sampled in the ADC 241 may be multiplied with a constant gain C by the synchronous delay unit 246 and the complex multiplier 246 to form a second path.

The synchronous delay unit 246 applies to a second path signal, a time delay caused while a first path signal passes through the sampling rate up-converter 242, the sampling rate down-converter 244, and the first digital filter 245. Thus, the time synchronization between the first path signal and the second path signal is possible.

The configurations of the ADC 241, sampling rate up-converter 242, sample delay unit 243, sampling rate down-converter 244, first digital filter 245, and the adder 248 of the sub-sampling block 240 are substantially the same as those of the sub-sampling block 140 in FIG. 1. The complex multiplier 247 is similar in function to the second digital filter 146 in FIG. 1 but may be provided with a simpler configuration. That is, it has been described that the response characteristic of the second digital filter 146 as defined in Equation 10 is a constant and not the function of a frequency. Thus, the complex multiplier may be provided as a simple complex multiplier for providing a constant gain and not as a digital filter having high complexity.

Figure 6:
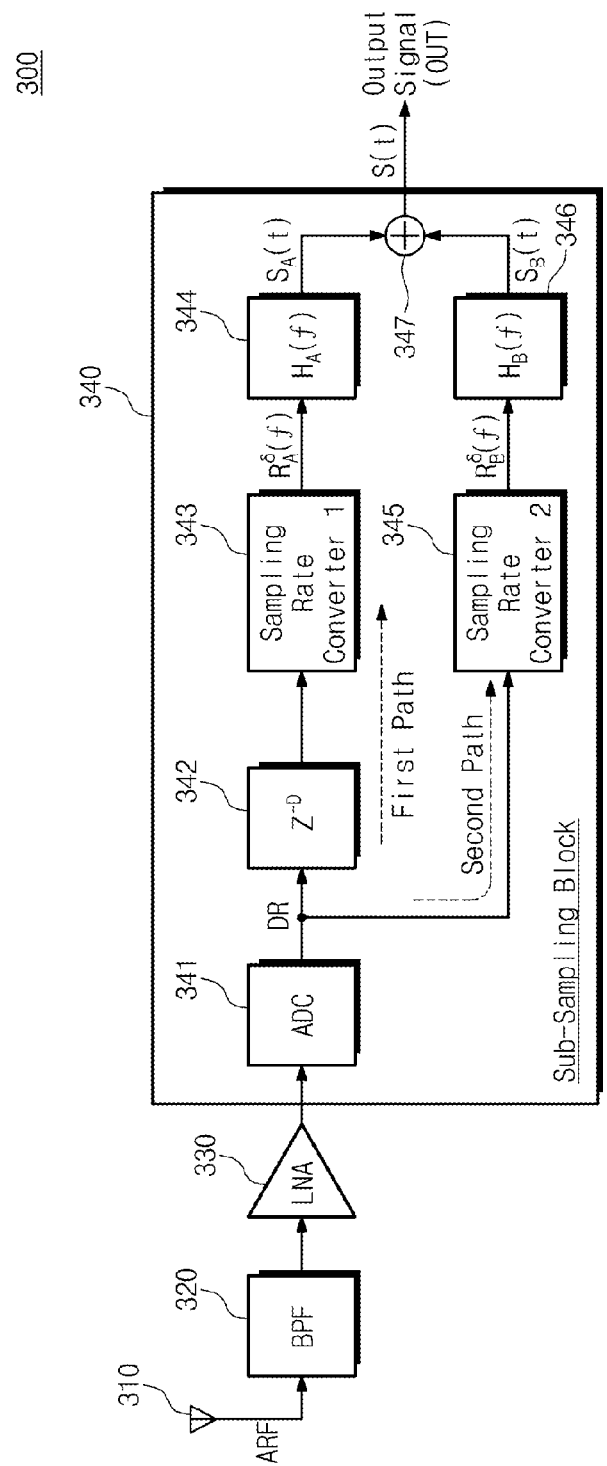
FIG. 6 is a block diagram of a receiver according to a second embodiment of the present invention.

FIG. 6 is a block diagram of a receiver according to a second embodiment of the present invention. Referring to FIG. 6, a receiver 300 according to the second embodiment of the present invention may include an antenna 310, a band filter 320, an LNA 330, and a sub-sampling block 340. In this example, it is well understood that a digital up/down-converter (not shown) located at the rear end of the sub-sampling block 340 may be added as needed. In this example, the sub-sampling block 340 includes a first path that provides a sample delay and sampling rate adjustment for a baseband signal, and a second path in which the sampling rate adjustment is implemented without the sample delay. Through such a configuration, the sub-sampling block 340 may effectively remove aliasing occurring in a baseband.

The antenna 310 receives an analog radio frequency ARF signal transmitted wirelessly and transmits it to the band filter 320. The band filter 320 passes a signal in a specific frequency band among received analog radio frequency ARF signals. The band filter 320 may be designed so that a pass band is limited to a certain bandwidth B, and removes out-of-signal-band noise. In an exemplary embodiment, a pass band and pass bandwidth B that are set in the band filter 320 may be fixed values or adjusted to another values. The LNA 330 amplifies a signal selected by the band filter 320 by a certain gain. A signal amplified by the LNA 330 is transmitted to the sub-sampling block 340 including an ADC 341.

The sub-sampling block 340 includes the ADC 341, a sample delay unit 342, a first sampling rate converter 343, a first digital filter 344, a second sampling rate converter 345, a second digital filter 346 and an adder 347. In this example, a baseband signal DR output from the ADC 341 is divided into a first path that provides a sample delay and a sampling rate adjustment and a second path in which the sampling rate adjustment is implemented without the sample delay. The first path through which the baseband signal DR is transmitted includes the sample delay unit 342, the first sampling rate converter 343 and the first digital filter 344. The second path includes the second sampling rate converter 345 and the second digital filter 346.

The baseband signals DRs transmitted to the first path and the second path are processed by the first sampling rate converter 343 and the second sampling rate converter 345, respectively. Each of the first sampling rate converter 343 and the second sampling rate converter 345 may be adjusted to have L/M times the sampling rate $f_s$ of the baseband signal DR. Thus, when the baseband signal DR having the sampling rate $f_s$ passes through the sample delay unit 342 and the first sampling rate converter 343, it has a fractional delay of D×L/M. However, when the baseband signal DR having the sampling rate L passes through the second sampling rate converter 345, only the ratio of the sampling rate changes by L/M times.

The fractional delay effect occurring in the first path due to an asymmetrical delay effect by the sample delay unit 342 plays an important role in designing a filter for removing aliasing. In addition, the sampling rate adjustments by the first sampling rate converter 343 and the second sampling rate converter 345 may provide fractional delay effects of various sizes for a system in which a delay is controlled on a sample basis.

Figure 7:
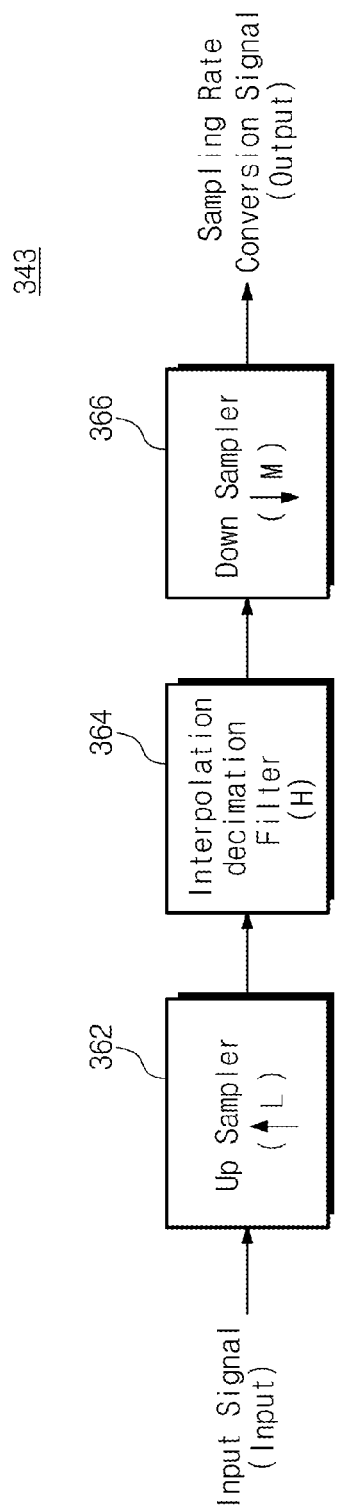
FIG. 7 is a schematic, block diagram of a first sampling rate converter 343 or a second sampling rate converter 345 of FIG. 6.

FIG. 7 is a schematic, block diagram of the first sampling rate converter 343 or the second sampling rate converter 345 in FIG. 6; Referring to FIG. 7, the first sampling rate converter 343 includes an up-sampler 362, an interpolation/decimation filter 364, and a down-sampler 366.

The up-sampler 362 increases the sampling rate of an input signal to a sampling rate higher than the sampling rate $f_s$ of the ADC 341. That is, the up-sampler 362 may up-convert a sampling rate by L times.

The interpolation/decimation filter 364 performs interpolation and decimation filtering on an up-sampled baseband signal provided from the up-sampler 362.

The down-sampler 366 decreases the sampling rate to be lower than the sampling rate $f_s$ of the ADC 341. That is, the down-sampler 366 may down-convert the sampling rate by M times. In this example, L representing the up sampling rate and M representing the down sampling rate may be provided as integers, respectively.

According to the first sampling rate converter 343 having such a configuration as described above, the sampling rate of the baseband signal that is D-sample delayed may change by L/M times.

Figure 8A:
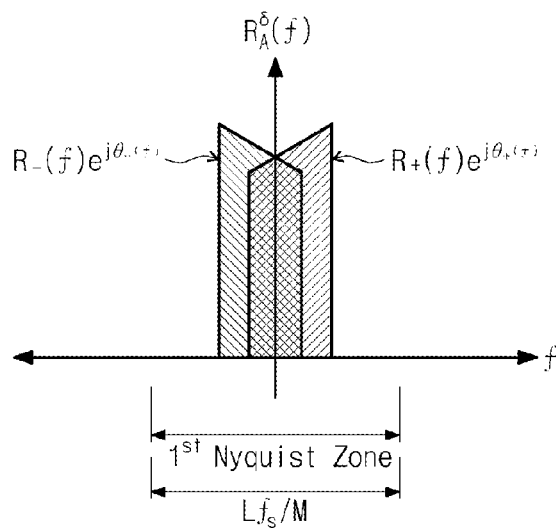
FIGS. 8A and 8B illustrate the spectrums of first and second path signals of the sub-sampling block 340 of FIG. 6, respectively.
Figure 8B:
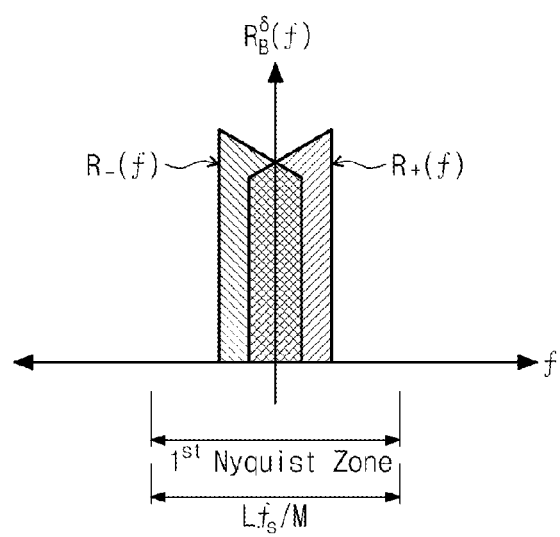

FIGS. 8A and 8B illustrate the spectrums of first and second path signals of the sub-sampling block 340 in FIG. 6.

FIG. 8A shows the characteristic of the spectrum $R_A\delta(f)$ of the first path signal that is generated when the digital baseband signal DR output from the ADC 341 passes through the sample delay unit 442 and the first sampling rate converter 343. In this example, only a spectrum in a first Nyquist zone of the spectrum $R_A\delta(f)$ of the first path signal is shown. FIG. 8B shows the characteristic of the spectrum $R_B\delta(f)$ of the second path signal that is generated when the digital baseband signal DR output from the ADC 341 is processed by the second sampling rate converter 345. In this example, only a spectrum in a first Nyquist zone of the spectrum $R_B\delta(f)$ of the second path signal is shown.

The first path signal having the spectrum $R_A\delta(f)$ of the first path signal is a signal D-sample delayed when compared to the second path signal having the spectrum $R_B\delta(f)$. Thus, the spectrum $R_A\delta(f)$ of the first path signal includes a group delay effect due to a relative time delay difference in comparison to the spectrum $R_B\delta(f)$ of the second path signal. As a result, the spectrum $R_A\delta(f)$ of the first path signal has the same effect as that the group delay is included in the spectrum $R_B\delta(f)$ of the second path signal by the time delay difference between paths.

The group delay effect due to the time delay of the spectrum $R_A\delta(f)$ of the first path signal is represented as a phase shift effect given by Equation 11 below.

$$e^{j\theta_-(f)} = e^{j2\pi nLD/M} e^{-j2\pi LDf/(Mf'_s)}$$

$$e^{j\theta_+(f)} = e^{j2\pi nLD/M} e^{-j2\pi LDf/(Mf'_s)}$$ <Equation 11>

The group delay effect is represented as a phase shift of $e^{j\theta_-(f)}$ with respect to a spectrum component shifted from a negative frequency band. On the contrary, the group delay effect is represented as a phase shift of $e^{j\theta_+(f)}$ respect to a spectrum component shifted from a positive frequency band. In this example, n is a frequency band location index of a signal and any one of integers equal to or larger than zero. The frequency index location index n is determined by the carrier frequency $f_c$ of a signal and the output sampling rate $f'_s = Lf_s/M$ of the first sampling rate converter 343 and may be given by $round(f_c/f'_s)$.

When considering the relationship between the spectrum $R_A\delta(f)$ of the first path signal and the $R_B\delta(f)$ of the second path signal as described above, it is possible to remove a spectrum component shifted from a negative frequency band or a spectrum component shifted from a positive frequency band to obtain an intended complex baseband signal. In the following, a method of designing the first digital filter 344 and the second digital filter 346 is described in consideration of the relationship between the spectrum $R_A\delta(f)$ of the first path signal and the spectrum $R_B\delta(f)$ of the second path signal.

The spectrum $R_A\delta(f)$ of the first path signal and the spectrum $R_B\delta(f)$ of the second path signal in a first Nyquist zone band may be expressed by Equations 12 and 13, respectively.

$$R_A^\delta(f) = f_s' \begin{Bmatrix} R_-(f)e^{j2\pi nLD/M} e^{-j2\pi LD/(Mf_s')} + \\ R_+(f)e^{-j2\pi nLD/N} e^{-j2\pi LDf/(Mf_s')} \end{Bmatrix} \quad \text{(Equation 12)}$$

$$R_B^\delta(f) = f_s'\{R_-(f) + R_+(f)\} \quad \text{<Equation 13>}$$

In addition, when spectrum $R_A\delta(f)$ of the first path signal and the spectrum $R_B\delta(f)$ of the second path signal are processed by the first digital filter 344 and the second digital filter 346, they are output as the first spectrum $S_A\delta(f)$ of Equation 14 and the second spectrum $S_B\delta(f)$ of Equation 15.

$$S_A^\delta(f) = H_A(f)f_s' \begin{Bmatrix} R_-(f)e^{j2\pi nLD/M} e^{-j2\pi LDf/(Mf_s')} + \\ R_+(f)e^{-j2\pi nLD/M} e^{-j2\pi LDf/(Mf_s')} \end{Bmatrix} \quad \text{(Equation 14)}$$

$$S_B^\delta(f) = H_B(f)f_s'\{R_-(f) + R_+(f)\} \quad \text{<Equation 15>}$$

Then, the spectrum of an output signal output from the adder 347 may be expressed by Equation 16 below. It has been described that a result of filtering the spectrum $R_A\delta(f)$ of the first path signal passing through the first digital filter 344 and a result of filtering the spectrum $R_B\delta(f)$ of the second path signal passing through the second digital filter 346 are added by the adder 347. However, in another embodiment, it is well understood that the adder 347 may be replaced with a subtractor.

$$S(f) = R_-(f)f_s'\{H_A(f)e^{j2\pi nLD/M}e^{-j2\pi LDf/(Mf_s')} + H_B(f)\} + R_+(f)f_s'\{H_A(f)e^{-j2\pi nLD/M}e^{-j2\pi LDf/(Mf_s')} + H_B(f)\} \quad \text{<Equation 16>}$$

When there is a need to remove a spectrum component shifted from a negative frequency band and extract only a spectrum component shifted from a positive frequency band, Equation 17 below should be satisfied.

$$S(f) = R_-(f)f_s'\{H_A(f)e^{j2\pi nLD/M} e^{-j2\pi LDf/(Mf_s')} + H_B(f)\} \quad \text{(Equation 17)}$$
$$R_+(f)f_s'\{H_A(f)e^{-j2\pi nLD/M} e^{-j2\pi LDf/(Mf_s')} + H_B(f)\}$$
$$= R_+(f)$$

In order to satisfy Equation 17, simultaneous equations given by Equations 18 and 19 below should be satisfied.

$$f_s'\{H_A(f)e^{j2\pi nLD/M}e^{-j2\pi LDf/(Mf_s')} + H_B(f)\} = 0 \quad \text{<Equation 18>}$$

$$f_s'\{H_A(f)e^{j2\pi nLD/M}e^{-j2\pi LDf/(Mf_s')} + H_B(f)\} = 1 \quad \text{<Equation 19>}$$

When the simultaneous equations satisfying Equations 18 and 19 are solved, respective response functions of the digital filters are obtained as follows:

$$H_A(f) = \frac{e^{j2\pi LDf/(Mf_s')}}{f_s'(e^{-j2\pi nLD/M} - e^{j2\pi nLD/M})}, |f| < \frac{f_s'}{2} \quad \text{(Equation 20)}$$

$$H_B(f) = \frac{1}{f_s'(1 - e^{-j4\pi nLD/M})}, |f| < \frac{f_s'}{2} \quad \text{(Equation 21)}$$

$H_A(f)$ and $H_B(f)$ obtained in this manner may be easily implemented through a digital FIR filter. In addition, $H_B(f)$ is a constant and not the function of a frequency, as could be seen in Equation 21. Thus, it may be seen that the filter characteristic $H_B(f)$ of the second digital filter 346 may be easily implemented by only complex multiplication.

Also, as could be seen in Equations 20 and 21, the sampling rate $f_s$ of the ADC 341, the sample delay value D of the sample delay unit 342, and the up conversion rate L and the down conversion rate M should satisfy $2nLD/M \neq m$ (where m is an integer). In addition, in order to satisfy $2nLD/M \neq m$ (where m is an integer), the sampling rate $f_s$, sample delay value D and up sampling rate N, and down sampling rate M may be adjusted. In this example, n represents the location index of a wireless signal frequency band and m represents any integer.

Figure 9:
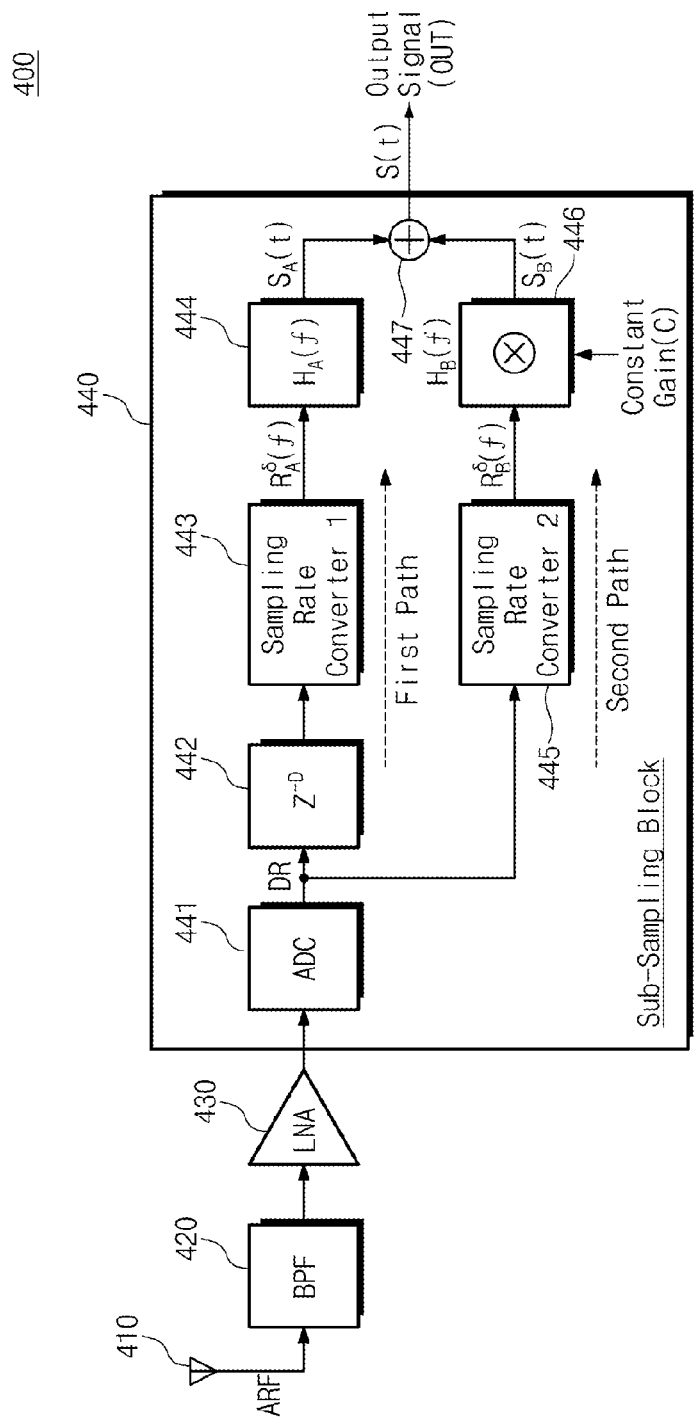
FIG. 9 is a block diagram of a receiver according to a third embodiment of the present invention.

FIG. 9 is a block diagram of a receiver according to a third embodiment of the present invention. Referring to FIG. 9, a receiver 400 according to the third embodiment of the present invention may include an antenna 410, a band filter 420, an LNA 430, and a sub-sampling block 440. In this example, it is well understood that a digital up/down-converter (not shown) located at the rear end of the sub-sampling block 440 may be added as needed. In this example, the sub-sampling block 440 includes a first path that provides a sample delay and sampling rate adjustment for a baseband signal, and a second path which provides only a gain for the baseband signal. Through such a configuration, the sub-sampling block 440 may effectively remove aliasing occurring in a baseband.

The antenna 410 receives an analog radio frequency ARF signal transmitted wirelessly and transmits it to the band filter 420. The band filter 420 passes a signal having a specific bandwidth among received analog radio frequency ARF signals. The band filter 420 may be designed so that a pass band is limited to a certain bandwidth B, and removes out-of-signal-band noise. In an exemplary embodiment, a pass band and pass bandwidth B that are set in the band filter 420 may be fixed values or adjusted to another values. The LNA 430 amplifies a signal selected by the band filter 420 by a certain gain. A signal amplified by the LNA 430 is transmitted to the sub-sampling block 440 including an ADC 441.

The sub-sampling block 440 includes the ADC 441, a sample delay unit 442, a first sampling rate converter 443, a first digital filter 444, a complex multiplier 446, a second sampling rate converter 445, and an adder 447. In this example, a baseband signal DR output from the ADC 441 is divided into a first path that provides a sample delay and a sampling rate adjustment and a second path which provides a gain of constant C for a signal. The first path through which the baseband signal DR is transmitted includes the sample delay unit 442, the first sampling rate converter 443 and the first digital filter 444. The second path includes the second sampling rate converter 445 and the complex multiplier 446 for providing a gain C.

The first sampling rate converter 443 may be adjusted to have L/M times the sampling rate $f_s$ of the baseband signal DR. Thus, when the baseband signal DR having the sampling rate $f_s$ passes through the sample delay unit 442 and the first sampling rate converter 443, it has a fractional delay of D×L/M times. In this example, it is possible to effectively remove aliasing occurring in the first path through the adjustments of the sampling rate $f_s$, sample delay value D, up sampling rate L, and down sampling rate M. The fractional delay effect occurring in the first path due to an asymmetrical delay effect by the sample delay unit 442 plays an important role in designing a filter for removing aliasing.

Figure 10:
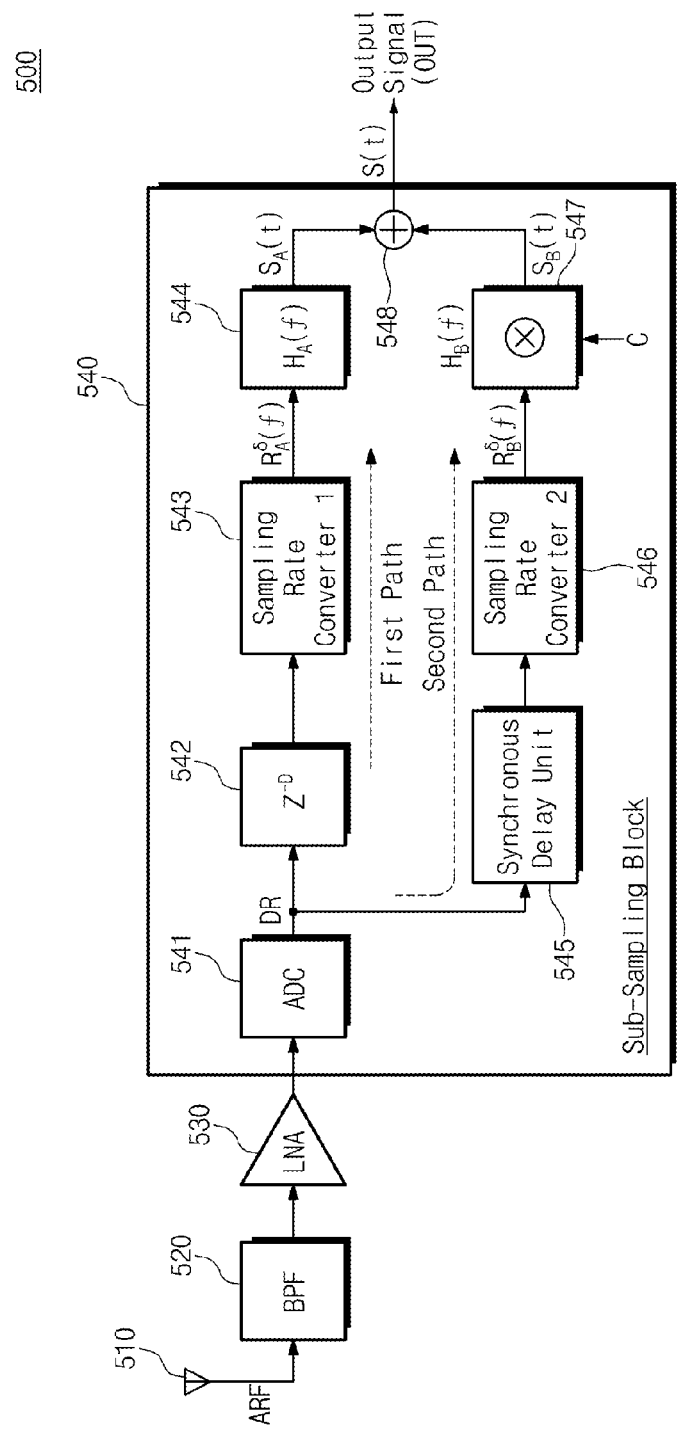
FIG. 10 is a block diagram of a receiver according to a fourth embodiment of the present invention.

FIG. 10 is a block diagram of a receiver according to a fourth embodiment of the present invention. Referring to FIG. 10, a receiver 500 according to the fourth embodiment of the present invention further includes a synchronous delay unit 545 for synchronizing a delay between paths, in the sub sampling block 440 in FIG. 9.

The synchronous delay unit 545 delays a second path signal by a time delay resulting from the digital filtering of a first path signal by a first digital filter 544. Thus, the time synchronization between the first path signal and the second path signal is possible.

The receiver 500 may include an antenna 510, a band filter 520, an LNA 530, and a sub-sampling block 540. In this example, the sub-sampling block 540 includes a first path that provides a sample delay and sampling rate adjustment for a baseband signal, and a second path that includes the synchronous delay unit 545 provided for a time delay resulting from the digital filtering of the first path and synchronization. Through such a configuration, the sub-sampling block 540 may effectively remove aliasing occurring in a baseband through a simple structure change to the receiver 400 of FIG. 9.

Figure 11:
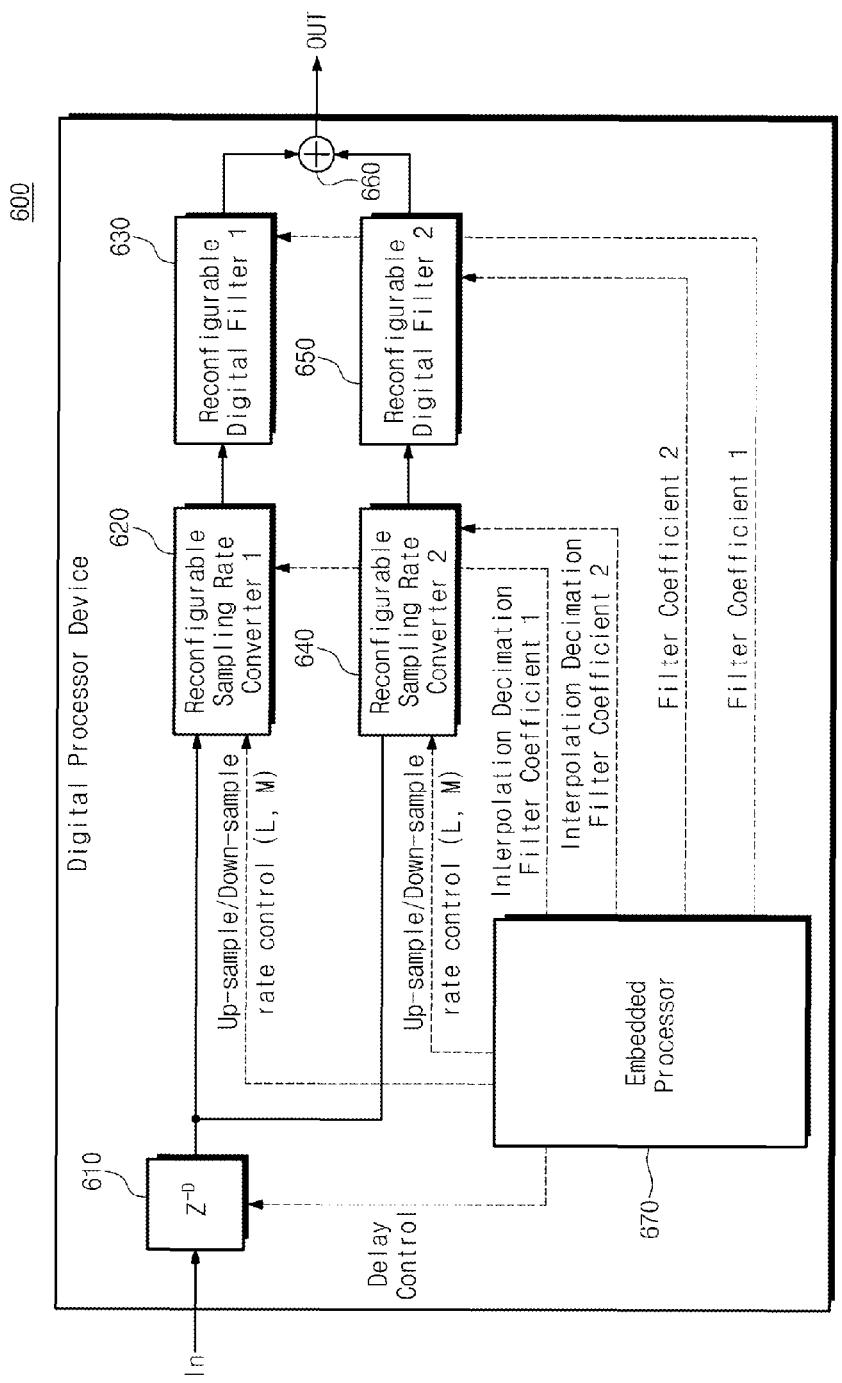
FIG. 11 is a block diagram of a reconfigurable sub-sampling device that may apply the characteristics of a receiver of the present invention in various methods.

FIG. 11 is a block diagram of a reconfigurable sub-sampling device that may apply the characteristics of a receiver of the present invention. Referring to FIG. 11, a reconfigurable sub-sampling device 600 includes a reconfigurable sample delay unit 610, a first reconfigurable sampling rate converter 620, a second reconfigurable sampling rate converter 640, a first reconfigurable digital filter 630, a second reconfigurable digital filter 650, an adder 660, and an embedded processor 670.

The embedded processor 670 may set the reconfigurable sample delay unit 610, first reconfigurable sampling rate converter 620, second reconfigurable sampling rate converter 640, first reconfigurable digital filter 630, and second reconfigurable digital filter 650 with parameters corresponding to a set operation condition. That is, the embedded processor 670 may adjust the sample delay value D of the reconfigurable sample delay unit 610. The embedded processor 670 may adjust the up or down sample rates L and M of the first reconfigurable sampling rate converter 620 and the second reconfigurable sampling rate converter 640. The embedded processor 670 may adjust the interpolation and decimation filter coefficients ID Filter Coefficient 1 and ID Filter Coefficient 2 of each of the first reconfigurable sampling rate converter 620 and the second reconfigurable sampling rate converter 640 according to an operation condition. The embedded processor 670 may adjust the filter coefficients Filter Coefficient 1 and Filter Coefficient 2 of the first reconfigurable digital filter 630 and the second reconfigurable digital filter 650 according to an operation condition.

The reconfigurable sub-sampling device 600 may be flexibly applied to receiving devices having various frequencies and communication techniques, as a digital processor device. Thus, the operation characteristics of the sub-sampling blocks described in first to fourth embodiments above may be implemented through the parameter adjustment of the reconfigurable sub-sampling device 600.

The reconfigurable sub-sampling device 600 according to the present invention may be configured by using available digital devices such as a field-programmable gate array (FPGA) or a digital signal processor (DSP). Firstly, the embedded processor 670 calculates the frequency band location index n of a wireless signal. The frequency band location index n may be calculated by using the relationship of n=round ($f_c/f_s$) as described above. Next, the embedded processor 670 calculates and stores the sample delay value D, up sampling rate L, and down sampling rate M in order to satisfy 2nLD/M≠m (where m is an integer) or in order that C is equal or close to 2 in Equation 23.

When the sampling rate $f_s$, sample delay value D, up sampling rate L, and down sampling rate M are determined, the embedded processor 670 sets the sample delay value of the reconfigurable sample delay unit 610 with reference to the sample delay value D. Then, the embedded processor 670 sets the sample rates of the first reconfigurable sampling rate converter 620 and the second reconfigurable sampling rate converter 640 based on the up sampling rate L and down sampling rate M calculated.

In addition, the embedded processor 670 uses the sample delay value D, up sampling rate L, down sampling rate M and frequency band location index n to reconfigure the characteristics of the first reconfigurable digital filter 630 and the second reconfigurable digital filter 650. That is, the embedded processor 670 calculates the filter coefficients Filter Coefficients 1 and 2 to set the reconfigurable digital filters 630 and 650.

Lastly, the embedded processor 670 calculates the interpolation and decimation filter coefficients ID Filter Coefficients 1 and 2 of the first reconfigurable sampling rate converter 620 and the second reconfigurable sampling rate converter 640 operating at the sampling rate $f_s$. The reconfigurable sampling rate converter 620 and the second reconfigurable sampling rate converter 640 performs L−1 zero-insertions between samples depending on the up sampling rate L already set and then performs interpolation filtering on an input signal. A signal on which the interpolation filtering has been performed passes through a decimation filter and then a sample every M samples is deleted depending on the down sampling rate M already set, so the sampling rate of the input signal is converted by L/M times.

According to the reconfigurable sub-sampling device 600 of the present invention, it is possible to receive a wideband RF signal located at any frequency band without a change in hardware. In order to receive the wideband RF signal located at any frequency band without a change in hardware, the filter coefficient of a digital filter designed changes depending on a signal bandwidth B, the sampling rate $f_s$ of the ADC, the sample delay value D, and the conversion ratio of sample rates L/M.

Figure 12:
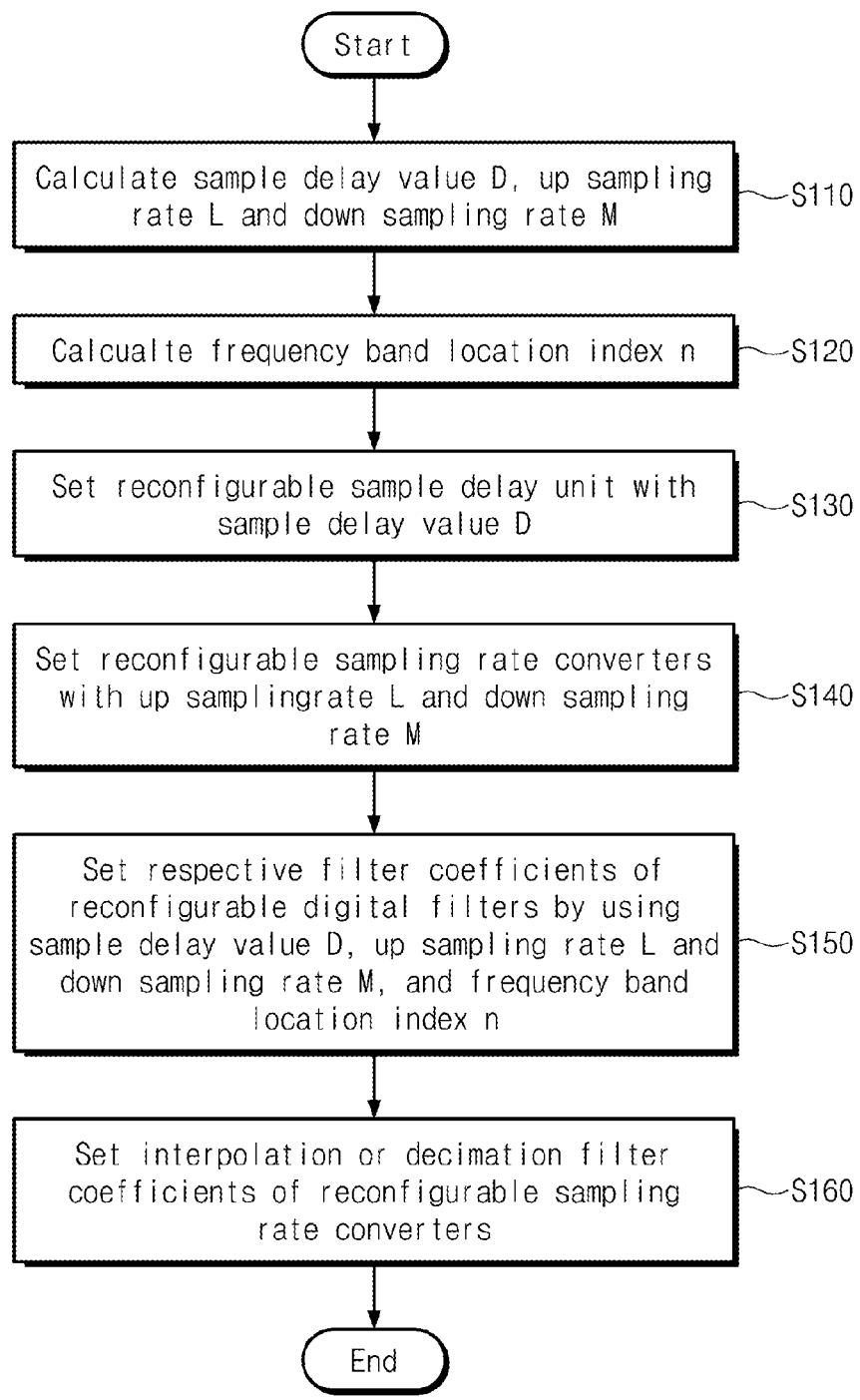
FIG. 12 is a simple flowchart of an operating method of a reconfigurable sub-sampling device 600 of FIG. 11.

FIG. 12 is a simple flowchart of an operating method of the reconfigurable sub-sampling device 600 of FIG. 11. Referring to FIG. 12, the reconfigurable sub-sampling device 600 may perform the reconfiguration operation of the present invention for the initialization or reset of a receiver.

In step S110, the embedded processor 670 calculates the sample delay value D, the up sampling rate L, and the down sampling rate M. The processor 670 calculates and stores the sample delay value D, up sampling rate L, and down sampling rate M in order to satisfy 2nLD/M≠m (where m is an integer) or in order that C in Equation 23 is equal or close to 2.

In step S120, the reconfigurable sub-sampling device 600 calculates a frequency band location index n with reference to a carrier frequency $f_c$ and the sampling rate $f_s$ of a sampling rate converter. The frequency band location index n may be calculated with round ($f_c/f_s$). Such an operation may be performed by the embedded processor 670.

In step S130, the embedded processor 670 sets the delay size of the reconfigurable sample delay unit 610 to the sample delay value D already determined. For example, the embedded processor 670 may set the size of the delay tab of the reconfigurable sample delay unit 610.

In step S140, the embedded processor 670 sets the sample rates of the first reconfigurable sampling rate converter 620 and the second reconfigurable sampling rate converter 640 to the up sampling rate L and down sampling rate M determined. The up and down sampling rates L and M of the first reconfigurable sampling rate converter 620 and the second reconfigurable sampling rate converter 640 may be provided as the same value.

In step S150, the embedded processor 670 sets the characteristics of the first reconfigurable digital filter 630 and the second reconfigurable digital filter 650. That is, the embedded processor 670 calculates the filter coefficients Filter Coefficients 1 and 2 corresponding to the filter characteristics calculated to set the reconfigurable digital filters 630 and 650. The embedded processor 670 uses the sample delay value D, up sampling rate L, down sampling rate M and frequency band location index n to determine the filter coefficients of the first reconfigurable digital filter 630 and the second reconfigurable digital filter 650. In addition, the first reconfigurable digital filter 630 and the second reconfigurable digital filter 650 are set with the determined filter coefficients Filter Coefficients 1 and 2.

In step S160, the embedded processor 670 calculates the interpolation and decimation filter coefficients ID Filter Coefficients 1 and 2 of the first reconfigurable sampling rate converter 620 and the second reconfigurable sampling rate converter 640 operating at the sampling rate $f_s$. The reconfigurable sampling rate converter 620 and the second reconfigurable sampling rate converter 640 performs L−1 zero-insertions between samples depending on the up sampling rate L already set and then performs interpolation filtering on an input signal. A signal on which the interpolation filtering has been performed passes through a decimation filter and then a sample every M samples is deleted depending on the down sampling rate M already set, so the sampling rate of the input signal is converted by L/M times. The embedded processor 670 sets the first reconfigurable sampling rate converter 620 and the second reconfigurable sampling rate converter 640 with the determined interpolation and decimation filter coefficients ID Filter Coefficients 1 and 2.

When the setting of the overall sub-sampling block is completed through above steps, the reconfigurable sub-sampling device 600 processes a signal received through an antenna to provide it as a baseband signal.

According to the present invention as described above, it is possible to directly down-convert an RF signal located at any band by using a sub-sampling receiver using only a single ADC or a single RF chain. Thus, since it is possible to receive a signal having any frequency band by using a single receiver, there is no need to re-design a receiver depending on a frequency band and thus there is an advantage in that the present invention is very economical.

Also, according to the present invention, since there is no need for an analog element such as a local oscillator, it is possible to provide a receiver enabling low power consumption, miniaturization and low costs. In addition, according to the sub-sampling technique of the present invention, integration for accommodating multi-mode/multi-band is easy.

Also, since the receiver of the present invention uses minimum sampling frequencies, it is possible to minimize requirements for the ADC and baseband signal processing. In addition, the sub-sampling technique of the present invention may provide relatively excellent performance in comparison to a typical sub-sampling technique.

Exemplary embodiments of the present invention have been discussed so far. It is understood by a person skilled in the art that various changes in form may be made therein without departing from the essential characteristic of the invention. Therefore, the disclosed embodiments should be considered in descriptive sense only and not for purposes of limitation. The scope of the present invention is defined not by the detailed description of the invention but by the following claims, and all differences within a scope equivalent thereto are construed as being included in the present invention.

It is obvious to a person skilled in the art that the structure of the present invention may be modified or changed without departing from the scope or technical spirit of the present invention. When considering the descriptions above, it is considered that the present invention includes changes and modifications of the present invention if they are within the scopes of the following claims and their equivalents.

What is claimed is:

1. A wireless signal receiver comprising: an analog-digital converter (ADC) configured to convert an analog radio frequency (RF) signal into a digital baseband signal; and
   a sub-sampling block configured to generate a first path signal and a second path signal from the digital baseband signal, and configured to extract a complex baseband signal by using a relative sample delay difference between the first and second path signals, wherein the sub-sampling block comprises:
   a sampling rate up-converter configured to up-convert a sampling rate of the digital baseband signal;
   a sample delay unit configured to sample delay an output of the sampling rate up-converter; and
   a sampling rate down-converter configured to down-convert a sampling rate of an output from the sample delay unit to output as the first path signal;
   wherein the sub-sampling block is configured to generate the first path signal by applying the sample delay and the sampling rate conversion to the digital baseband signal and to generate the second path signal without adjusting the sampling rate of the digital baseband signal.

2. The wireless signal receiver of claim 1, wherein the sub-sampling block further comprises:
   a first digital filter configured to filter the first path signal;
   a second digital filter configured to filter the second path signal; and
   an adder configured to add a filtering result of the first digital filter to a filtering result of the second digital filter, and to output the result of the adder as the complex baseband signal.

3. The wireless signal receiver of claim 2, wherein the adder comprises a subtractor configured to subtract the filtering result of the second digital filter from the filtering result of the first digital filter, and to output the result of the subtractor as the complex baseband signal.

4. The wireless signal receiver of claim 2, wherein the relative sample delay difference between the first path signal and the second path signal is determined by at least one of: a sampling rate of the ADC, a delay size of the sample delay unit, and sampling conversion rates of the sampling rate up-converter and the sampling rate down-converter.

5. The wireless signal receiver of claim 2, wherein respective filter coefficients of the first digital filter and the second digital filter are determined by at least one of: a carrier frequency of the analog RF signal, a frequency band location index of the analog RF signal, a sampling rate of the ADC, a delay size of the sample delay unit, and a conversion ratio N of the sampling rate down-converter.

6. The wireless signal receiver of claim 5, wherein the sampling rate $f_s$, the delay size D of the sample delay unit, and the sample conversion ratio N of the sampling rate down-converter are set to satisfy the relationship 2nD/N ≠ m, wherein n is a frequency band location index of the analog RF signal, and m is an integer.

7. The wireless signal receiver of claim 2, wherein the first digital filter and the second digital filter are determined to satisfy at least one of:

$$S(f) = S_A^\delta(f) + S_B^\delta(f) \\ = R_+(f),$$ Equations $$S(f) = S_A^\delta(f) + S_B^\delta(f) \\ = R_+(f),$$ Equations $$S(f) = S_A^\delta(f) + S_B^\delta(f) \\ = R_-(f)$$ Equations and $$S(f) = S_A^\delta(f) + S_B^\delta(f) \\ = R_-(f),$$ Equations wherein S(f) is a spectrum of an output signal of the adder, $S_A^\delta(f)$ corresponds to a spectrum of an output signal of the first digital filter, $S_B^\delta(f)$ corresponds to a spectrum of an output signal of the second digital filter, R_(f) corresponds to a negative frequency spectrum of the digital baseband signal, and R_+(f) corresponds to a positive frequency spectrum of the digital baseband signal.

8. The wireless signal receiver of claim 2, wherein the second digital filter comprises a complex multiplier configured to amplify the digital baseband signal, to a gain having a certain size.

9. The wireless signal receiver of claim 8, further comprising:
a synchronous delay unit configured to delay the digital baseband signal by a specific delay time to provide to the complex multiplier.

10. A wireless signal receiver comprising:
an analog-digital converter (ADC) configured to convert an analog radio frequency (RF) signal into a digital baseband signal; and
a sub-sampling block configured to generate a first path signal and a second path signal from the digital baseband signal, and configured to extract a complex baseband signal by using a relative sample delay difference between the first and second path signals, wherein the sub-sampling block comprises:
a sample delay unit configured to sample delay the digital baseband signal, on at least one sample basis, and
a first sampling rate converter configured to change a sampling rate of an output from the sample delay unit to provide a fractional delay effect to the first path signal, and to output the result of the first sampling rate converter as the first path signal;
wherein the sub-sampling block is configured to generate a first path signal by applying the sample delay and the sampling rate conversion to the digital baseband signal, and to generate the second path signal by adjusting a sampling rate of the digital baseband signal without a sample delay of the digital baseband signal.

11. The wireless signal receiver of claim 10, wherein the sub-sampling block further comprises:
a first digital filter configured to filter the first path signal;
a second sampling rate converter configured to change a sampling rate of the digital baseband signal, and to output the result of the second sampling rate converter as the second path signal;
a second digital filter configured to filter the second path signal; and
an adder configured to add a filtering result of the first digital filter to a filtering result of the second digital filter, and to output the result of the adder as the complex baseband signal.

12. The wireless signal receiver of claim 11, wherein the adder comprises a subtractor configured to subtract the filtering result of the second digital filter from the filtering result of the first digital filter, and to output the result of the subtractor as the complex baseband signal.

13. The wireless signal receiver of claim 11, wherein the relative delay difference between the first path signal and the second path signal is determined by at least one of:
a sampling rate of the ADC, a delay size of the sample delay unit, and sampling conversion rates of the first sampling rate converter and the second sampling rate converter.

14. The wireless signal receiver of claim 11, wherein respective filter coefficients of the first digital filter and the second digital filter are determined by at least one of: a carrier frequency of the analog RF signal, a frequency band location index of the analog RF signal, a sampling rate of the ADC, a delay size of the sample delay unit, and a conversion ratio L/M of the first sampling rate converter to the second sampling rate converter.

15. The wireless signal receiver of claim 14, wherein the sampling rate $f_s$, a delay size D of the sample delay unit, and the sample conversion ratio L/M of the first sampling rate converter and the second sampling rate converter are set to satisfy the relationship 2nLD/M ≠ m, wherein n is a frequency band location index of the analog RF signal, and m is an integer.

16. The wireless signal receiver of claim 11, wherein the first digital filter and the second digital filter are determined to satisfy at least one of:

$$S(f) = S_A^\delta(f) + S_B^\delta(f) \\ = R_+(f),$$ Equations $$S(f) = S_A^\delta(f) + S_B^\delta(f) \\ = R_+(f),$$ Equations $$S(f) = S_A^\delta(f) + S_B^\delta(f) \\ = R_-(f),$$ Equations and $$S(f) = S_A^\delta(f) + S_B^\delta(f) \\ = R_-(f),$$ Equation wherein S(f) is a spectrum of an output signal of the adder, $S_A^\delta(f)$ corresponds to a spectrum of an output signal of the first digital filter, $S_B^\delta(f)$ corresponds to a spectrum of an output signal of the second digital filter, R_(f) corresponds to a negative frequency spectrum of the digital baseband signal, and $R_+(f)$ corresponds to a positive frequency spectrum of the digital baseband signal.

17. The wireless signal receiver of claim 11, wherein the second digital filter comprises a complex multiplier configured to amplify the second path signal by a gain having a certain size.

18. The wireless signal receiver of claim 17, further comprising:
   a synchronous delay unit configured to delay the second path signal by a specific delay time to provide to the complex multiplier.

19. The wireless signal receiver of claim 2, wherein the second path signal is a signal obtained without applying sampling delay.

20. A wireless signal receiver comprising:
   an analog-digital converter (ADC) configured to convert an analog radio frequency (RF) signal into a digital baseband signal; and
   a sub-sampling block configured to divide and process the digital baseband signal into a first path signal and a second path signal, and configured to divide and process a complex baseband signal, by using a relative sample delay difference between the first and second path signals, wherein the sub-sampling block comprises:
      a first sampling rate converter configured to change the sampling rate of the digital baseband signal,
      a sample delay unit configured to sample delay an output of the first sampling rate converter, on at least one sample basis, and
      a second sampling rate converter configured to change a sampling rate of an output from the sample delay unit to output as the first path signal;
   wherein the sub-sampling block is configured to obtain the first path signal by adjusting the sample delay and the sampling rate of the digital baseband signal, and to obtain the second path signal without adjusting a sampling rate of the digital baseband signal.

* * * * *